INVENTOR.
Raymond W. Donaldson.
BY
ATTORNEY

Oct. 14, 1952 — R. W. DONALDSON — 2,614,178
OVERHEAD SWITCHING SYSTEM
Filed Feb. 18, 1949 — 3 Sheets-Sheet 2
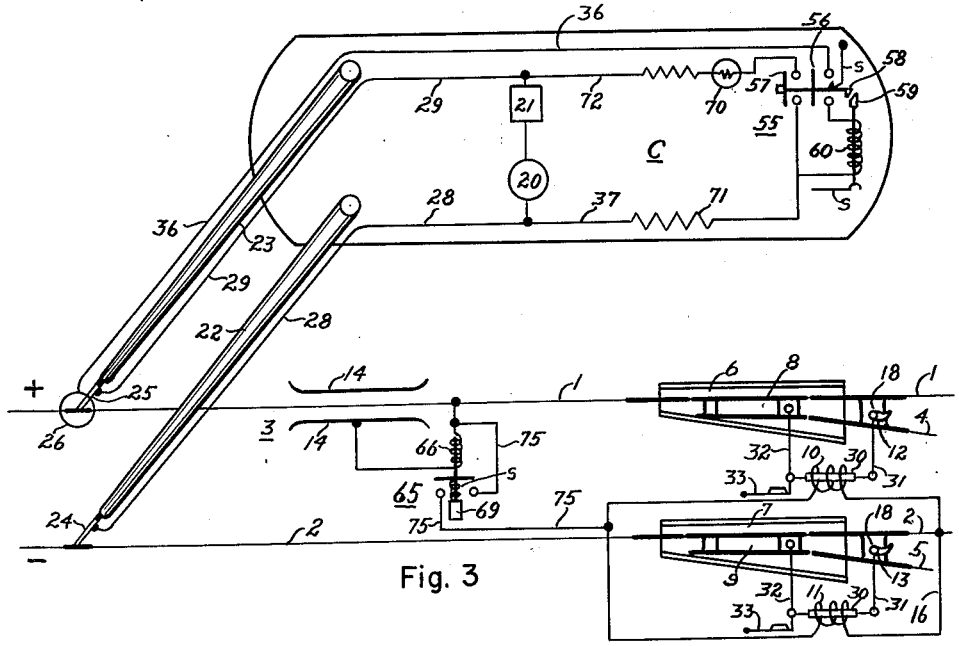
Fig. 3
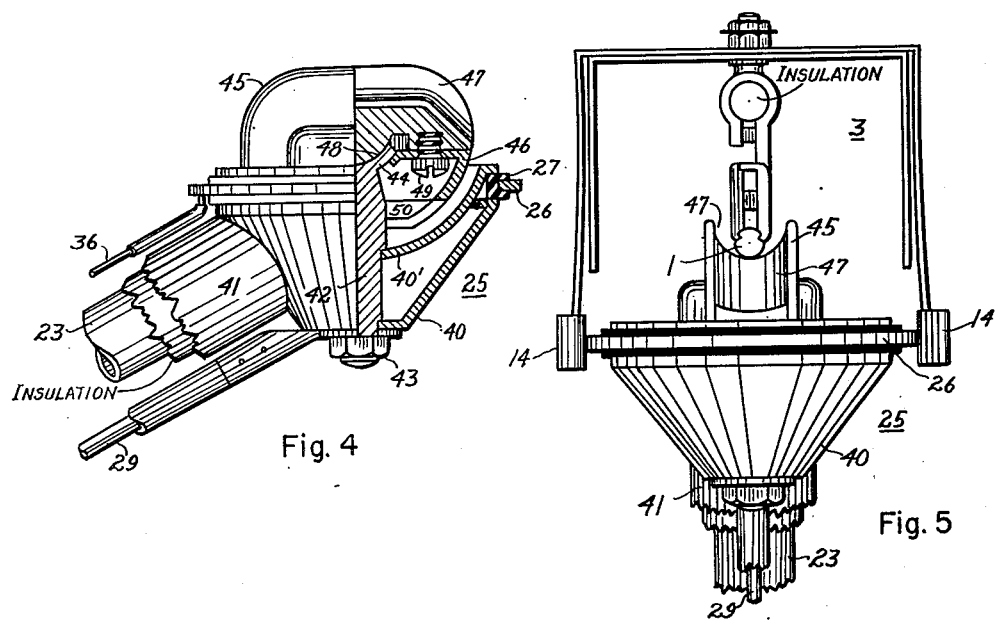
Fig. 4
Fig. 5
INVENTOR.
Raymond W. Donaldson.
BY
ATTORNEY Oct. 14, 1952     R. W. DONALDSON     2,614,178
OVERHEAD SWITCHING SYSTEM
Filed Feb. 18, 1949     3 Sheets-Sheet 3
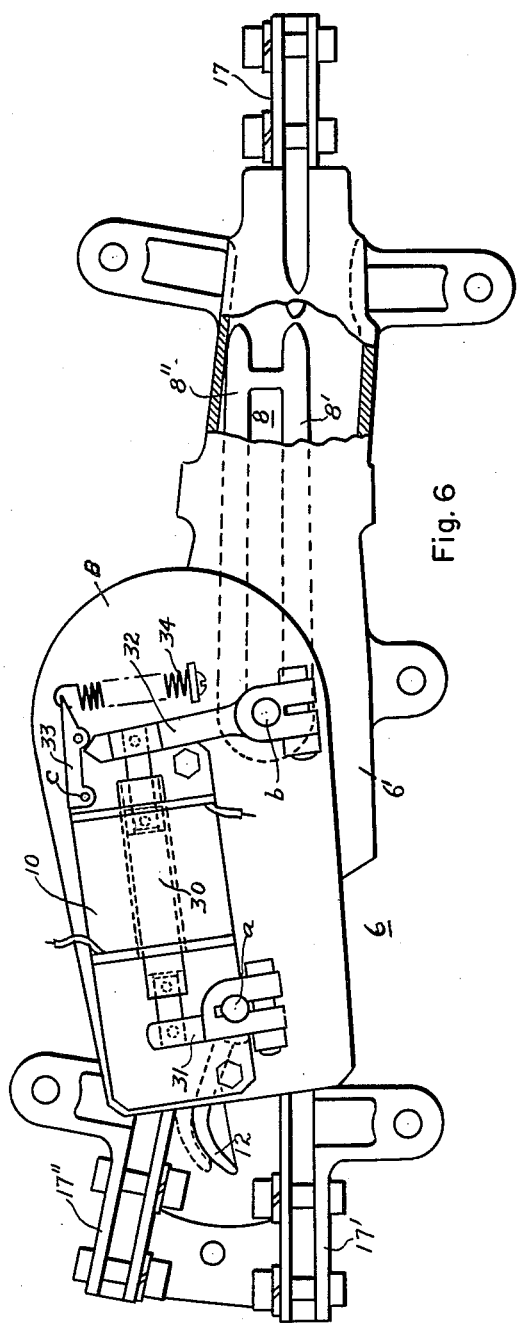
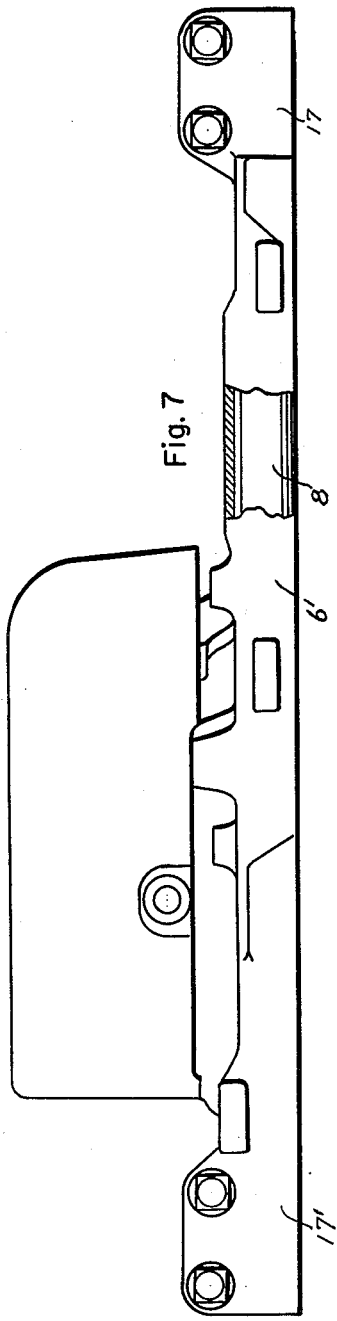
INVENTOR.
Raymond W. Donaldson.
BY
ATTORNEY Patented Oct. 14, 1952

2,614,178

UNITED STATES PATENT OFFICE 2,614,178

OVERHEAD SWITCHING SYSTEM

Raymond W. Donaldson, Lexington, Ohio, assignor to The Ohio Brass Company, Mansfield, Ohio, a corporation of New Jersey Application February 18, 1949, Serial No. 77,208

11 Claims. (Cl. 191—38)

My invention relates to the operation of electrically operated vehicles of the trolley bus type and trolley frogs or switches for guiding the current collectors mounted on the bus along the desired path at a turnout point.

The overhead system now in general use for controlling the movement of the current collectors at a straight-away and turn-out point is disclosed in U. S. Patent 2,264,839 and requires two or three staggered contact members associated with the trolley wires in advance of the frog or switch.

In the trolley bus system there are two parallel trolley wires, positive and negative and the vehicle, since it does not follow a definite course, as in the case of a street car operating on a track, the bus may wander from side to side of the street, sometimes parallel to the trolley wires, below or to one side of the same or the vehicle may move at an angle to the trolley wires.

In order to properly operate the trolley frog to properly direct the movement therethrough of the current collectors, depending whether the vehicle is to move straight ahead along the main line or to make a turn, the operator of the vehicle must so maneuver the same, that the current collectors will properly engage the contact members which control the operation of the frog tongues.

In the present systems in use there are two contacts or three depending upon the type of frog used. Some frogs require the current collectors to engage two contact members simultaneously each time the vehicle is to move straight ahead or follow a branch trolley wire which means three contact members are required while other frogs known as electrically resetting types require only two contact members which are diagonally positioned relative to each other and both are simultaneously engaged by the current collectors, as for instance, when it is desired to follow branch trolley wires leading away from the frogs.

Now the above described systems now in use are highly satisfactory so long as the vehicle operator is able to properly maneuver the vehicle so as to properly engage or avoid engaging, whichever is necessary, the contact members to set the frog tongues for the desired direction of travel of the vehicle.

At the present time careful maneuvering of the bus or coach is necessary to guide the coach through traffic and position the vehicle so that the current collectors will engage the contact members for proper operation of the frogs.

Another type of frog for turnouts is known as a "power-on" and "power-off" frog which however does not lend itself to dense traffic conditions.

The object of my improved overhead system is to provide one in which the operation of the overhead trolley frogs or switches may be operated from the vehicle vestibules by the operator merely pressing a button without "power-on" or "power-off" application of the motor controller or relative positioning of the current collectors as required in operating frogs with the present systems described above.

My improved system is intended to overcome the necessity of exact positioning of contact members and bus so that its current collectors under all traffic conditions will properly engage the contactors.

There are several advantages to trolley coach operation with my improved system, namely—(a) simple push-button control which is far better than cautious and difficult maneuvering of the coach through traffic, the operator hoping the current collectors will engage the contact members as required for proper operation of the frog tongues; (b) since no critical time element is involved, the speed of the coach past the frogs may be increased; (c) contactors may be more easily arranged where right and left turnouts are required; (d) the elimination of elaborate push-button control panels in storage yards, by using only indicating lights for routing coaches in their respective bays; (e) no painted lanes would be required in storage yard operation as now required with the present system.

My invention is disclosed in the specification which follows and shown schematically in the attached drawings and other objects and benefits of my improved system will be apparent from such description and drawings.

Fig. 1 shows the basic arrangement of my improved overhead system.

Figs. 2 and 3, each shows a modification of my improved overhead switching system.

Fig. 4 shows in partial section the current collector head I propose to use to engage one of the trolley wires and a contactor.

Fig. 5 is an end view of a contactor as shown in U. S. Patent 2,195,734 and also shows the current collector head as passing through the contact member.

Fig. 6 shows the constructive arrangement of the frogs shown schematically in Figs. 1, 2 and 3; both frogs in Figs. 1, 2 and 3 are alike.

Fig. 7 shows a side view of Fig. 6 but includes a cover for the frog operating mechanism.

Figure 1:
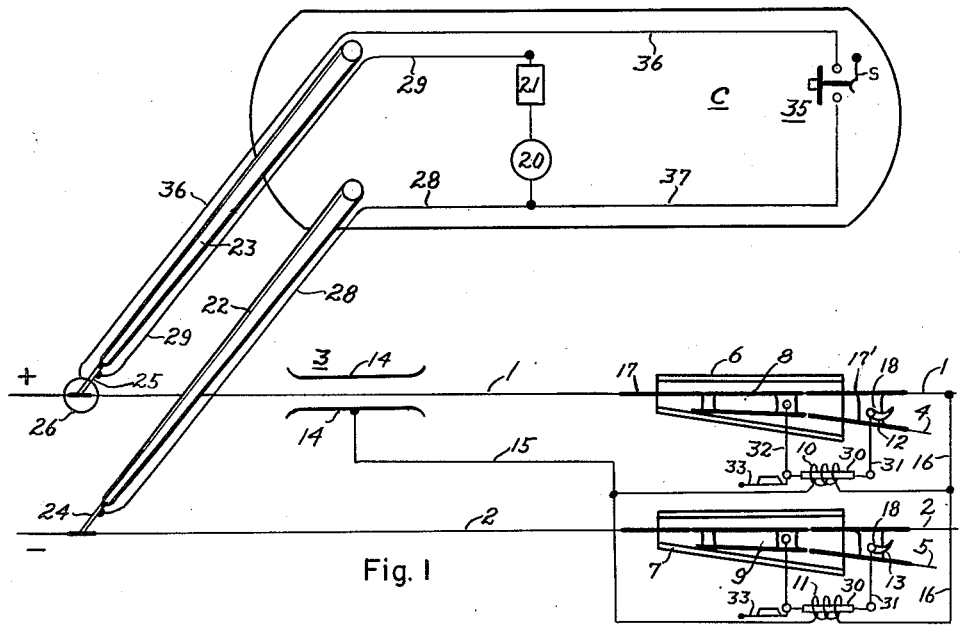

In Fig. 1, the main trolley wires, positive and negative, are indicated as 1 and 2 respectively. The contact member 3 (hereinafter called contactor) is mounted on one of the trolley wires and the contact elements or blades are insulated normally from the trolley wire 1.

Branch trolley wires 4 and 5 lead from the main trolley wires 1 and 2 respectively and at each junction of a main and branch wire a trolley frog or switch 6—7 is respectively positioned.

The frogs shown in the drawings are of the mechanically reset type shown and described in U. S. Patent 2,299,914, that is the frogs each have a tongue 8—9 respectively normally set for straight through or main line operation and are also provided with coils 10—11 respectively which when energized will effect a change in the setting of the frog tongues and when the tongues have been changed to guide the current collector from the main conductor onto the branch conductor, the tongues are then mechanically reset by the passing current collector to their normal main line position.

This reset type of switch or frog requires only one operating coil for each frog and while the coils 10 and 11 are shown as connected in parallel, they may be connected in series as will be well understood. Each coil is mounted on its respective switch pan to operate the tongue to its turn-out position and the tongue is returned to its normal main line position when the current collector engages the trips 12—13 respectively after the collector has passed the tongue.

The contactor blades 14 are electrically connected together but normally insulated from the trolley wire 1 as in Fig. 5 and are connected by a conductor 15 to the parallel connected coils 10—11 and the coils in turn are electrically connected to the trolley wire 1 or to the pan of the switch 6 which is energized and of the same polarity as trolley wire 1, by the conductor 16.

Figure 2:
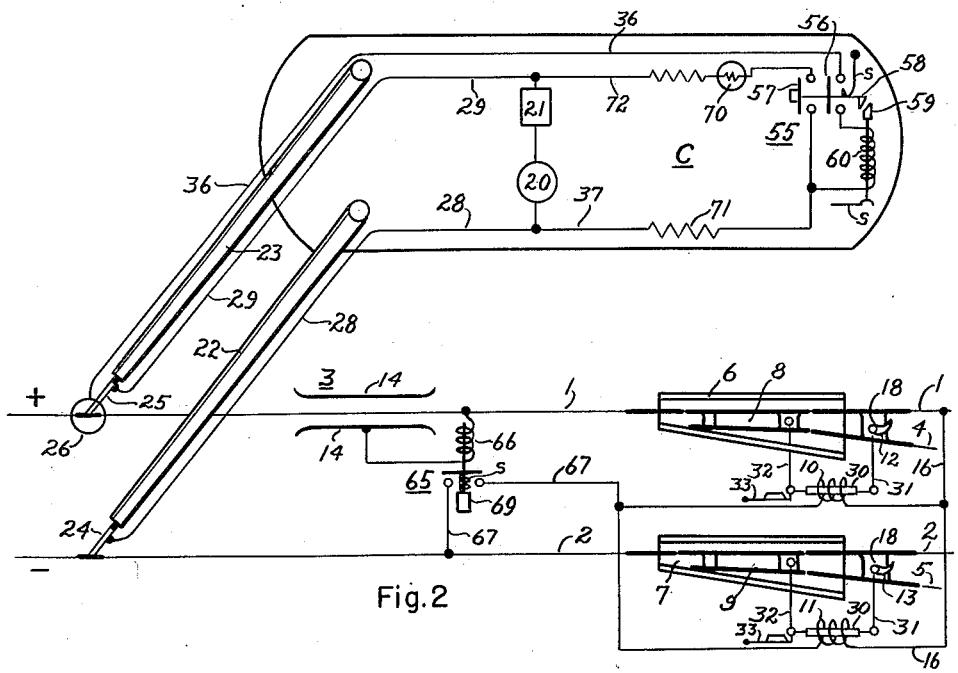

Figs. 6 and 7 shows a more complete arrangement of the frog operating mechanism of Figs. 1, 2 and 3 and particularly the mechanism for resetting the tongue as disclosed in Patent 2,299,914. The frog as shown in Figs. 6 and 7 is the same as 8 and 9 in Figs. 1, 2 and 3 and like numbers apply in the several figures where possible.

The pan 6 is shown with arms or runners 17 and 17' for the main trolley wire 1, and the arm 17" for the branch wire. The frog is provided with an operating coil 10 which is connected as shown in the respective systems of Figs. 1, 2 and 3 and later described, and when energized operates the frog mechanism to move the tongue to one of its two positions. As shown in the several figures the energization of the coil 10 (or 11) will position the tongue 8 (or 9) to its branch position.

The tongue 8 is shown with two guides 8' and 8", and is pivoted to the pan at one end by a pin b which is fixed to the tongue to pivot therewith and as stated is mounted on the pan as is also the entire reset mechanism.

The coil 10 is provided with a reciprocating armature 30. A lever 31 is fixed to pin a which is pivoted to the cross member 18 (exposed to view in Figs. 1, 2, 3) and pivotally attached to one end of the armature 30. Fixed to the lever 31 adjacent the member 18 by means of pin a is the contact or trip member 12 arranged as a rule to normally take the position shown in Fig. 6 but also has a position shown by dotted lines in Fig. 6 in which position the tongue will be in the branch position and the trip member will be engaged by the flange on a passing current collector and thereby moved to the normal position shown in Figs. 1, 2, 3 and 6 in which the tongue 8 is set to guide the current collector between the arms 17 and 17'. A lever 32 is fixed to the pin b and pivotally attached to the other end of the armature 30.

When the trip lever is engaged and moved by the current collector from the dotted to the full line position of Fig. 6, the lever 31 is also moved as the trip 12 and lever 31 are fixed to the pin a and thus the opposite end of the lever 31 moves to the left and at the same time the armature 30 moves with the lever 31 and simultaneously the free end of the lever 32 moves with the armature and the tongue 8 (or 9) is reset to its normal position shown in Figs. 1, 2, 3 and 6 since the pivoting end of lever 32 is fixed to the pin b and the pin b fixed to move with the tongue 8 (or 9).

The member 33 is a latch pivoted at c and yieldably held by a spring 34 to hold the operating mechanism against inadvertent movement.

In Fig. 6 only one frog is shown and described since both frogs are of the same construction and the manner of electrically connecting them is disclosed in Figs. 1, 2 and 3.

The trolley coach or vehicle C is provided with a motor 20 and controller 21 therefor and on the vehicle roof are two trolley poles 22—23 pivotally mounted thereon as is usual practice.

The trolley pole 22 is provided at its upper end with a current collector head 24 such for instance as disclosed and described in U. S. Patent 1,893,383 and the pole 23 is equipped with a current collector head 25 which is a modification of the head shown in the patent by the inclusion of a metal ring 26 (see Figs. 4–5) which surrounds the current collector head in insulated relation thereto by the interposed insulating member 27.

The controller 21 and motor 20 are shown connected in series while a conductor 28 connects the current collector 24 to one side of the motor and the conductor 29 connects the current collector 25 to one side of the controller; thus the motor is connected to the positive and negative trolley wires with the controller interposed and the motor will be energized when the controller is closed.

As the vehicle moves along toward the frogs 6 and 7 the current collector head 25 will enter the contactor 3 and the ring or connector 26 will engage the contactor blades 14 (see Fig. 5).

It will be apparent that since there is only one contactor to be engaged prior to the current collectors reaching the frogs that it will not be necessary for the vehicle operator to be exacting as to the position of the vehicle relative to the trolley wires as where there are two or three contactors to be engaged in a particular manner as previously described.

It is now necessary however for the operator to close a switch 35 conveniently located in the bus and which may be of the push-button type in order to effect an operation of the frogs 6 and 7 if the bus is to make a turn since the frogs are normally set for main line operation. If the bus is to continue straight through the switch 35 is not closed.

When the control switch 35 is closed with the current collector 25 engaging the contactor blades 14, current will flow from the positive trolley wire 1 or frog 6 through the conductor 16, coils 10 and 11, conductor 15, blades 14, connector ring 26, conductor 36, switch 35, conductors 37 and 28, and collector head 24 to the negative trolley wire 2.

The switch 35 being closed the coils 10 and 11 will be energized and the switch tongue 8 and 9 will be operated to the branch or turn-out positions and will remain so until the current collectors 24 and 25 have passed the tongues and engaged the trips 12 and 13 whereby the tongues return to their normal main line positions if of the reset type as described in Patent 2,299,914.

If the bus is not to make a turn then the control switch 35 is not closed. The operator may close the switch, if the bus is to make a turn, prior to the engagement of the connector 26 with the contactor 3 but the switch 35 must be closed while there is engagement of the connector 26 with contactor 3 after which the switch 35 is allowed to open.

The current collector head 25 is a modification of that disclosed and described in U. S. Patent 1,893,383 therefore I do not give herein an extensive description of the same. In general the collector comprises a support with a bowl shaped portion 40—40' constructed preferably of sheet metal with a socket portion 41 to receive the end of a trolley pole 23 with an interposed sleeve of insulating material preferably resilient rubber to absorb vibrations.

The bowl portion 40—40' has two registering openings through which extend the supporting pin 42 held in place by the nut 43 and having a flaring spherical shaped bearing 44.

The current collecting portion has two portions namely the shoe 45 and retaining portion 46, both of metal. The shoe is provided with a groove 47 to receive a trolley wire and guide the collector and a bearing 48 with a spherical surface engaging the spherical surface on the bearing 44 on the upper end of the pin 42.

The shoe is held in place by the retaining portion 46 which engages the lower face of the bearing portion 44 and is held to the shoe 45 by screws 49, thus permitting replacement of the shoe.

The shoe and retainer are arranged to rotate upon the pin 42 in a plane at right angles to the axis of the pin 42 and the slot 50 permits the shoe and retainer to pivot in a plane coinciding with the vertical axis of the pin. The screws 49 may be manipulated through the slot 50.

The bowl shaped portion 40—40' is provided with a metal ring 26 which is secured thereto with interposed insulation 27. The construction and assembly of the ring is such that it will not endanger the overhead construction should a de-wirement occur.

The conductor 29 connects to the bowl shaped portion 40 and the insulated conductor 36 connects to the ring 26 and both conductors may be arranged if so desired to extend to the bus through the pole 23 or along the outside of the pole.

This construction permits the trolley bus to have a wide latitude of operation relative to the trolley wires and still properly engage the contactor. The head 24 is the same as head 25 except the connecting ring 26 is omitted.

Another form of current collector head which may be used is shown in U. S. Patent 2,044,886 with the addition of the insulated ring 26 or other equivalent means.

The contactor 3 may be of the construction disclosed in U. S. Patent 2,195,734 in which the device is supported by the trolley wire with the contactor blades 14 insulated from the trolley wire.

Like parts in the various figures, as far as possible, are designated by the same characters.

Fig. 2 shows a modification of Fig. 1 in that the simple normally operated push-button switch 35 of Fig. 1 is replaced by a normally open locking type of push-button switch 55 which remains closed until the head 25 engages the contactor blades 14, thus the bus operator may close the switch 55 considerably before the contactor 3 is engaged by the collector head 25 and the switch will automatically open by spring action when such contact is made.

The switch 55 comprises two connecting bars 56 and 57 which close simultaneously. In closing the latch 58 interlocks with the spring held movable latch 59 whereby the switch remains closed until the latches release by energization of the coil 60.

In addition to the switch 55 in place of the switch 35 of Fig. 1 I employ in Fig. 2 a relay switch 65 associated with the contactor 3 and coils 10 and 11.

The relay switch 65 is a normally open spring held switch with a closing coil 66 connected between the contactor blades 14 and trolley wire 1. When the connecting means 26 of the collector 25 engages the blades 14 while the switch 55 is closed, then the coils 60 and 66 will be simultaneously energized and the switch 55 will be automatically opened and the relay switch 65 closed thus the circuit including the conductor 67 will be automatically closed or completed from trolley wire 2 through coils 10 and 11 and conductor 16 to trolley wire 1 or pan of frog 6 thus energizing the coils and moving the frog tongues to their turn-out position. When the switch 55 opens with the connector 26 in or out of engagement with the contactor blades 14 the relay switch 65 will automatically open slowly due to the dash-pot 69 and springs or other means to retard the opening of the relay.

The springs associated with the switches 35, 55 and 65 are indicated by s.

When the connector 26 engages with the blades 14 while the switch 55 is closed the path of current through the trolley bus is the same as in Fig. 1 except from switch 55 leads a conductor 72 connected to conductor 29 and controlled by connecting bar 57 whereby the signal light 70 or other means will indicate to the operator when the switch 55 is open or closed since it is not necessary for him to hold the switch closed as in case of switch 35.

In order to reduce the current carried by the parts 26, 55, 65 and the associated conductors, a resistance 71 is interposed in the conductor 37 to reduce the current to a minimum depending only upon that necessary to energize the coils 60 and 66 and at the same time reduce the potential difference between the collector head 25 and connecting means 26. This is an important feature of this system since the potential between the connecting member 26 and the associated trolley head 25 will be the full potential of the system (600 volts) when the switch 55 is closed without the resistance 71.

The proposed arrangement shown in Fig. 3 is identical in operation with that of Fig. 2 and the arrangement of parts and circuits is the same except the conductor or circuit 75 controlled by the relay switch 65 connects to trolley wire 1 and the coils 10 and 11 are connected to trolley wire 2 or pan of frog 7 instead of frog 6 or its pan. This avoids the parts of the spring held relay switch 65 being connected directly to the positive and negative trolley wires which usually are at a difference of potential of 600 volts.

In the arrangements above described the relative longitudinal position of the current collector 24 and 25 does not play any part in the operation of the frogs which is not the case with the system now in general use, therefore the vehicle operator is not obliged to pay any particular attention as to how he maneuvers the bus with respect to the single contactor 3, but if it is desired to make a turn the operator must make sure that the push-button switch 35 or 55 has been closed some time prior to the trolley head 25 engaging the contactor 3 and remain closed until such engagement takes place, but in the case of switch 55 it is not necessary for him to hold the switch closed as in case of switch 35 since switch 55 remains closed until said engagement takes place and then it automatically opens.

The above described systems do not require depriving the motor circuit of current at any time in order to operate the frogs, also they do not require a break in the continuity of the trolley wires.

While the circuits for operating the vehicle motors and for the frogs are inter-connected, they function independently of each other.

Modifications will be suggested to those skilled in the art based on my disclosure, therefore I wish to be limited only by my claims.

I claim:

1. A control system for a pair of trolley frogs in a trolley transportation system comprising, a pair of main trolley wires and a branch wire from each main wire, a trolley frog located at the junction of the main and branch wires, each frog provided with a tongue movable from a main line position to a branch position to guide a pair of current collector heads positioned on a vehicle, a contactor positioned alongside one of the main trolley wires where the said wire is continuous and unbroken, the contactor being in insulated relation to the trolley wire and engageable by a current collector head, each head having a current collector to engage with and move along the said main wires and one head also having connecting means to engage and energize the contactor, the connecting means insulated from the collector head and from the associated current collector, electrical means to actuate the tongues, the electrical means being connected across the main trolley wires with an interposed normally open electrically controlled relay switch, the controlling portion of the relay switch being electrically connected to the contactor and to one of the main trolley wires, a motor control circuit including a controller on the vehicle and connected from one current collector to the other current collector, a frog control circuit on the vehicle including a normally open manually closable switch connected to the connecting means and to one of the current collector heads and operable to effect closure of the relay switch when the connecting means engages the contactor while the manually closable switch is closed, the said motor and frog control circuits energizable independently of the other.

2. In an electric transportation system, in combination, a pair of trolley frogs, a pair of main trolley wires and a branch wire from each main wire with a trolley frog positioned at each intersection of said wires, electrically operable means for each frog to move the frog tongue from one position to its other position, each electrically operable means provided with a coil to effect operation of the operable means, an electrically operated vehicle and a pair of current collector heads mounted thereon, each head provided with a current collector and one head provided with connecting means insulated from the associated current collector, a contactor associated with one main trolley wire in parallel and insulated relative thereto and engageable by the connecting means to energize the same, a normally open electrically closable relay switch to control the energization of the operating coils of the frog operating means, the operating coils connectable to the opposed trolley wires with the relay switch interposed, electrically operable means associated with the relay switch and connected between the contactor and the adjacent trolley wire to effect the closing of the relay switch when the contactor is engaged, a motor control circuit connected to the current collectors and a control circuit to effect energization of the contactor and the relay switch connected to the connecting means on the said one head and with the current collector on the other head, each circuit provided with a normally open manually operable control switch, the control circuits being so connected that each circuit is independently energizable of the other and each control switch operable independently of the other at will of the operator.

3. An electric transportation system as set forth in claim 2 in which the manually operable switch controlling the relay switch is provided with electrically operable means to hold the manually operable switch closed until the connecting means engages the contactor whereupon the contactor is energized and each frog tongue moved from one position to its other position and the manually operable switch simultaneously opened.

4. In a control system, in combination, a pair of trolley frogs and each frog provided with electrically controlled operating means connected together for simultaneous operation and located at the junction of a pair of main trolley wires and a branch trolley wire from each main wire and each frog provided with a movable tongue to guide a current collector head, a single contactor associated with one main trolley wire in spaced, parallel and insulated relation thereto and electrically connected to the said operating means for the frogs whereby the operating means will be energized when the contactor is energized, an electrically operated vehicle, a pair of current collector heads mounted on the electrically operated vehicle and each collector head provided with a current collector to separately engage a main trolley wire and associated frog, the current collector associated with the said one main trolley wire provided with connecting means insulated from the head and from the associated current collector to engage the contactor in advance of the current collector engaging the frog associated with the said one main trolley wire and to disengage the contactor before the associated current collector engages the frog, a motor control circuit connected to both current collectors to effect operation of the vehicle motor and including a normally open manually operable switch means, a frog control circuit extending from the connecting means to the non-associated current collector and including a normally open manually closable switch whereby energization of the connecting means and the contactor and the operating means for both trolley frogs will be effected simultaneously when the connecting means engages the single contactor while the last said manually operable switch is closed, the control switches independently operable of each other, electrically operable releasable means to hold the last said switch closed until the releasable means is energized through engagement of the connecting means with the contactor to release the closed switch and de-energize the connecting means, the said control circuits and connecting means and current collectors and control switches being so constructed and related and so connected that either control switch is operable to either its open or its closed position such that the frog control circuit or the motor control circuit may be energized or de-energized independently of the other control circuit and without adversely affecting the operation of the frogs or of the vehicle motor of the said other control circuit as the case may be.

5. An electric transportation system comprising, a vehicle, means to electrically actuate the vehicle, a pair of current collector heads mounted on the vehicle and each head provided with a current collector pivotally mounted on a substantially vertical axis, connecting means secured to one head and encircling the current collector in a plane normal to the axis of the current collector and in insulated relation to the current collector, a pair of main trolley wires and a branch wire from each main wire and a trolley frog positioned at the junction of each main and branch wire, each frog provided with a movable tongue to guide the current collectors straight through or onto the branch wire, electrically operated means to actuate the tongue, a contactor positioned alongside one main trolley wire in insulated relation thereto and wholly in advance of and spaced relative to the associated frog and engageable by the passing connecting means, the continuity of that portion of said one main trolley wire adjacent the contactor being un-interrupted, a normally open manually operable motor control switch and a normally open manually operable frog control switch, conductors connecting the said switches to the current collectors and to the connecting means respectively, whereby the vehicle operating means and the connecting means may be independently energized and both frog tongues moved from one position to their other position when the connecting means engages and energizes the contactor with the manually operable frog control switch closed without depriving the vehicle of operating current, and releasable means to hold the frog control switch closed until the said releasable means is operated.

6. A control system for a trolley frog provided with a tongue movable to two positions, comprising, a source of current, mechanism associated with the frog to operate the tongue thereof to either of its positions, the mechanism provided with a coil means arranged when energized to operate the mechanism to move the tongue to one of its positions, a contactor positioned alongside of the source of current in insulated and parallel relation thereto, an electrically operable vehicle, a current collector head carrying a current collector mounted on the electrically operable vehicle and drawing current from the said source, the said head provided with connecting means encircling the head in a substantially horizontal plane and insulated therefrom and adapted to engage the contactor, a normally open electrically operated relay switch electrically connected to the contactor and to the adjacent source of power and electrically connecting the coil means to the source of current to effect energization thereof and movement of the frog tongue in one direction when the electrically operated relay switch is closed, circuit means on the vehicle including a normally open manually closable switch to control the frog operation in one direction, the circuit means electrically connected to the connecting means on the current collector head and also electrically connected to the source of current whereby the contactor is energized when the circuit means is completed and the connecting means engages the contactor thereby energizing and closing the electrically operated switch whereby the said coil means on the said mechanism is energized and the tongue moved from one position to its other position, and mechanical means associated with the mechanism arranged when engaged by the current collector upon passing the frog tongue to operate the mechanism to move the tongue and return it to its original setting, the source of current adjacent the contactor being uninterrupted.

7. A control system for a trolley frog as set forth in claim 6 in which the electrically operated relay switch is provided with means to retard its opening until the connecting means has passed the contactor.

8. A control system as set forth in claim 6 with the addition of means in the frog control circuit to limit the current flow in the frog control circuit and the potential difference between the current collector and the associated connecting means.

9. An electric transportation system comprising an electrically operable vehicle, a pair of current collector heads mounted on the vehicle and each head provided with a current collector, a pair of main trolley wires and a branch wire from each main wire with a trolley frog positioned at each junction of the main and branch wires, each frog provided with a movable tongue to guide the current collector through the frogs in either of two directions, a single contact device associated with one of the main trolley wires in insulated relation thereto and positioned wholly in advance of the frogs, the continuity of the trolley wire adjacent the contact device being uninterrupted whereby the vehicle may draw current for its operation while passing the contact device without forced interruption thereof, mechanism to actuate the tongues to either position, the said mechanism provided with energizing means electrically connected to one of the trolley wires and to the single contact device to operate the mechanism to move the tongues to one position, a motor control circuit including a vehicle motor and controller therefor associated with the vehicle and connected to both current collectors to control the operation of the vehicle motor, one current collector head provided with connecting means so arranged as to engage with and energize the contact device as the vehicle passes adjacent the contact device either parallel to or obliquely to the main trolley wires, a second control circuit electrically connecting the connecting means to one of the current collectors to energize the connecting means accordingly, the last said control circuit including a normally open switch means operable by the vehicle operator to control the energization of the connecting means at will of the operator prior to the connecting means engaging the contact device thereby energizing the contact device and the energizing means of the said mechanism while the normally open switch means is closed, whereby the frog tongues will be actuated from their normal position to their other position, and mechanical means arranged when engaged by the current collector to operate the mechanism to return the tongues to their original position.

10. The combination in a control system for an electrically operable trolley frog located at the junction of a main and branch trolley wire system, of a contact device positioned alongside one of the wires of the system, a current collector mounted on a vehicle, a connecting member associated with the current collector and insulated from the current collector, the connecting member adapted to engage and energize the contact device, circuit means responsive to the energization of the contact device and including a normally open electrically closable relay type switch to control the operation of the electrically operable trolley frog from the contact device, a manually controlled circuit associated with the vehicle and electrically connected to the current collector and arranged to control the movement of the vehicle, a second control circuit electrically connected to the first said control circuit and to the connecting member to energize the connecting member, a manually operable normally open switch included in the said second control circuit to control the energization of the connecting member and in turn energize the contact device and the relay type switch when the connecting member engages the contact device while the said switch is closed, thereby operating the trolley frog without de-energizing the said controlled circuit controlling the movement of the vehicle, the said manually operable switch provided with means to maintain the switch closed after being closed by the vehicle operator until the connecting member engages and energizes the contact device, electrically controlled means to automatically release the closed switch when the connecting member engages the contact device, the said relay type switch provided with time delay opening means maintaining the relay means closed and the frog energized for a time after the manually operable switch has opened.

11. In a control system for guiding the current collector on a trolley bus comprising, a pair of trolley frogs each provided with a tongue movable to two positions, electrically controlled tongue operating means to actuate the tongues to one of the two positions, a pair of main trolley wires and a pair of branch trolley wires, the trolley frogs positioned at the junction of the main and branch wires, a contact device positioned alongside one of the main wires in insulated relation thereto and wholly in advance of the associated frog, the said one main wire being continuous alongside of the contact device, a pair of current collector heads of an electrically operated vehicle, a connecting member associated with one of the current collector heads and substantially encircling the same in insulated relation thereto, the connecting member and the contact device being so constructed and arranged that the connecting member will engage the contact device throughout its length as the current collector head passes the contact device and energizes the same when the connecting member is energized, a frog control circuit having two portions, one portion electrically connecting the electrically controlled tongue operating means to one of the trolley wires and to the contact device and the other portion electrically connecting the connecting member to the current collector head associated with the trolley wire of opposite polarity, the two portions of the frog control circuit being continuous when the connecting member engages the contact device, manually operable switch means associated with the said other portion of the frog control circuit whereby the frog control circuit may be energized at will by a vehicle operator to effect a change in the setting of the frog tongues, means associated with the tongue operating means to maintain the changed setting of the tongues until the current collector heads have passed the tongues, and mechanical means associated with the tongue operating means and engageable by the current collector heads to effect return of the tongues to their original setting after the heads have passed the tongues.

RAYMOND W. DONALDSON.

REFERENCES CITED

The following references are of record in the file of this patent:

UNITED STATES PATENTS

| Number | Name | Date |
|---|---|---|
| 1,396,690 | Mikulic | Nov. 8, 1921 |
| 2,155,242 | Ryan | Apr. 18, 1939 |
| 2,298,185 | Whittaker | Oct. 6, 1942 |
| 2,299,882 | Donaldson | Oct. 27, 1942 |
| 2,299,914 | Matthes | Oct. 27, 1942 |
| 2,360,064 | Lewis | Oct. 10, 1944 |
| 2,385,582 | Larsson | Sept. 25, 1945 |
| 2,393,388 | Lewis | Jan. 22, 1946 |
| 2,492,023 | Whittaker | Dec. 20, 1949 |